Dec. 6, 1966      A. E. CROTEAU      3,289,288
PROCESS OF INSTALLING PLASTIC LINERS INSIDE OF PIPES
Filed May 2, 1963
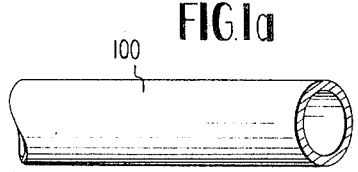
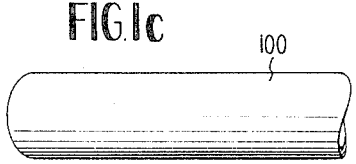
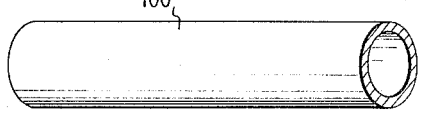
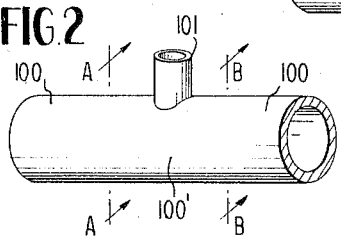
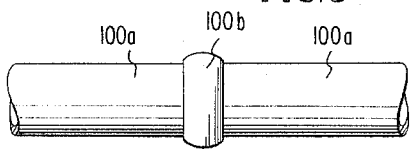
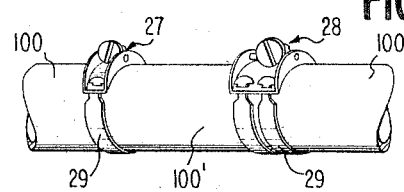
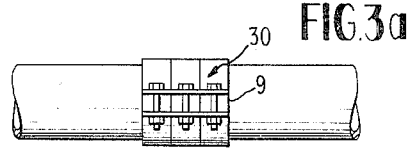
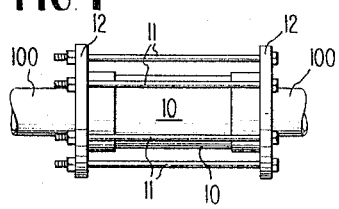
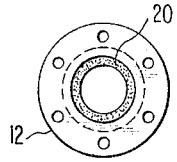
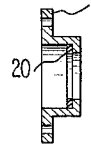
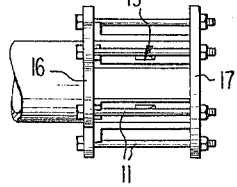
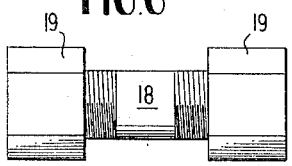
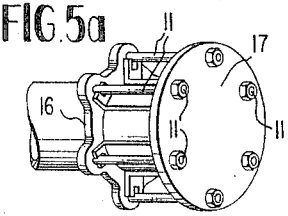
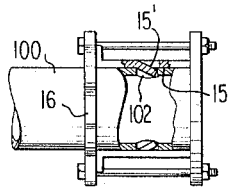
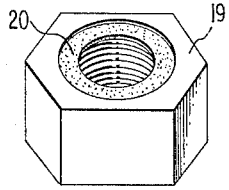
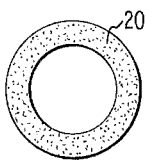
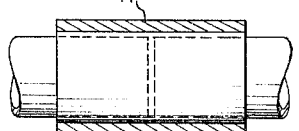
INVENTOR
ANTONIO E. CROTEAU
BY Paul M. Craig Jr.
ATTORNEYS

United States Patent Office 3,289,288
Patented Dec. 6, 1966

3,289,288
PROCESS OF INSTALLING PLASTIC LINERS
INSIDE OF PIPES
Antonio E. Croteau, Coachella, Calif.
(6612 Oceanview, Carlsbad, Calif.)
Filed May 2, 1963, Ser. No. 277,659
4 Claims. (Cl. 29—401)

The present invention relates to a method of installing plastic linings in all types of fluid carrying pipelines and to the fluid-tight joints obtained with such method.

Pipelines are subject to wear and failures either because of development of leakages or breaks or because the material transported through the pipelines attacks the steel tubing. Hence, a need exists to line pipelines with a plastic liner to lengthen the useful life of the pipeline.

The present invention proposes a method of installing the plastic liner which fulfills an existing need in the industry, utilizing polyethylene or any other suitable plastic material having sufficient flexibility to permit installation in accordance with the present invention.

The present invention is equally applicable to new pipeline installations as well as to pipeline installations which have been in use for some time and have developed leakages.

In its broad aspect, the present invention relates to a method for installing a plastic liner which comprises the steps of installing the plastic liner into a pipeline section by pulling the same through in any known manner, folding back over the end of the pipeline the liner and thereupon installing a fluid-tight joint by simple commercially available clamps or couplings that require no skill for installation and assembly.

Accordingly, it is an object of the present invention to provide a method for installing plastic liners into pipelines which is simple, relies on inexpensive commercially available couplings, yet provides a completely fluid-tight joint where necessary.

Another object of the present invention resides in a method for installing plastic liners into existing pipelines which can be installed quickly and provide permanent repairs. A further object of the present invention resides in a method of installing a plastic lining into pipelines to prevent corrosion of the metallic pipelines without sacrificing fluid-tightness of the line to thereby prolong the life of the pipeline to considerable extent.

A still further object of the present invention resides in a method of installing plastic linings into cement pipelines obviating the need for numerous cemented joints yet providing a fluid-tight joint between various sections of the pipeline.

Another object of the present invention resides in the provision of a pipeline installation utilizing a flexible plastic lining throughout its entire length to insure its continued operation even in case of breakage of the pipes, for example in case of earthquakes.

These and other objects, features, and advantages of the present invention will become more obvious from the following description when taken in connection with the accompanying drawing, which shows, for purposes of illustration only, several embodiments in accordance with the present invention, and wherein:

FIGURES 1a, 1b, and 1c are sections of a conventional pipeline cut in preparation to the installation of plastic lining in accordance with the present invention, FIGURE 2 is a perspective view, similar to FIGURE 1, indicating the application of the present invention to a pipeline provided with a branch line, FIGURE 2a is a view similar to FIGURE 2 showing an installed pipeline provided with a plastic lining in accordance with the present invention, FIGURE 3 shows a cement pipeline provided with a cement joint after installation of a plastic lining in accordance with the present invention, FIGURE 3a shows a modified embodiment of a conventional clamp for use with a cement pipeline, FIGURE 4 is an elevational view showing a pipeline installation provided with a plastic lining and fluid-tight joint assembly in accordance with the present invention.

FIGURE 4a is an end elevational view of the flange coupling used in the assembly of FIGURE 4, FIGURE 4b is an axial cross sectional view of the flange coupling of FIGURES 4 and 4a, FIGURE 5 is an elevational view showing a pipeline installation with a plastic liner in accordance with the present invention for an installation where the pipeline dead ends in a closure member, FIGURE 5a is a perspective view of the installation of FIGURE 5, FIGURE 5b is an axial cross sectional view of a part of the installation of FIGURE 5, FIGURE 6 is an elevational view showing a modified embodiment of a coupling connection for smaller pipes for use with installing a plastic liner in accordance with the present invention, FIGURE 6a is a perspective view of the nut used with the coupling of FIGURE 6, FIGURE 6b is an end elevational view of the sealing washer used with the arrangement of FIGURE 6, and FIGURE 7 is an axial cross sectional view through still a further modified embodiment in accordance with the present invention.

Referring now to the drawing wherein like reference numerals are used throughout the various views, and more particularly to FIGURE 1, reference numerals 100 designate the remaining sections of the pipeline after the section 100' has been cut off. The section 100' is removed to enable the installation of the plastic lining into the pipeline which is installed, for example, by pulling the plastic lining through the pipeline. After the plastic lining is pulled through the pipeline 100, the free end of the plastic lining is folded back over the end of the pipeline 100 on the outside thereof.

Next a flange coupling or clamp of any conventional construction such as a Baker or Dresser coupling generally designated by reference numeral 12 is slipped over the end of the pipe 100 and over the end of the folded back plastic lining. Next a conventional sealing washer 20 in FIGURES 4a and 6b is installed over the outside of the pipe and the sleeve 10 is next installed over the pipe end 100. The other end of the pipe 100 to be joined is prepared in a similar manner. Next the flange couplings 12 are drawn together by a suitable number of bolts 11 as shown in FIGURES 4 and 5a and are clamped by the usual bolt and nut arrangement to clamp securely the sealing ring 20 against the outside of the pipe end 100. As a result of this assembly, a fluid-tight joint is assured by the sealing washer 20 which provides such seal between the folded back end of the plastic lining, on the one hand, and the sleeve 10 and flange coupling 12 on the other. Notwithstanding the simplicity of the arrangement, a pressure-tight connection is obtained.

In case an existing pipeline has developed a leak, the length of the section of the existing pipe to be cut out and removed will, of course, be decided by the size of the pipe and the conditions under which the installers have to work.

While two clamp couplings are used to connect two pipeline sections with each other, only one clamp coupling is needed in a new pipe installation after the lining has been installed and folded back over the outside of the pipe as explained above.

FIGURE 2 is a partial perspective view showing by cross sectional lines A and B the planes where the branch line is connected to the main pipeline. With such an installation, an identical procedure as used in connection with FIGURES 1 and 4 may be used, except that the section of the pipe between planes A and B of FIGURE 2 will be coated with a plastic applied in any suitable known manner, for instance by brush or spraying.

FIGURE 2a is a showing similar to and illustrating an adapter generally designated by reference numerals 27 and 28 in FIGURE 2a. A number of strips are used in the embodiment to clamp the pipes together after the plastic liner has been installed and folded over the outside end of the pipes. The number of strips of course will depend on the size of the pipeline that is to be cut into the existing main line. The type of adapter illustrated in this figure is of conventional construction and will be made of a ductile material with the strips 29 flat. It is only necessary that the clamp body is large enough to permit an opening to be cut into the main line which in turn is large enough to permit the plastic lining to be cut and folded back over the outside of the pipe opening. After this is done a rubber or composition gasket is applied in this embodiment and the clamp is installed and tightened to complete the branch line connection opening.

FIGURE 3 illustrates the application of the present invention to a cement pipeline in which the plastic liner is folded back over the outside of pipe ends 100a. A joint is then made in any conventional manner by cementing the entire assembly, such cemented joint being schematically indicated by reference numeral 100b. However, care has to be exercised in making the cement joint 100b to insure that the cement extends at least two inches past the folded over plastic liner to assure a good bond with the cement pipe 100a.

If so desired a conventional clamp generally designated by reference numeral 30 in FIGURE 3a may be used to produce the joint when working with cement pipes. The length of the clamp 30 will of course depend on the size of the pipe.

Again, the liner of polyethylene or similar plastic material used on the inside of this clamp will insure a perfect seal.

vention for closing a plastic lined pipe in case of dead end vention for closing a plastic lined pipe in case of dead end of the pipe. A flat flange 16 is slipped over the outside of the pipe 100. To prevent the flange from sliding toward the free end of the pipe 100, that is toward the right as viewed in FIGURES 5 and 5b, a retainer 15 is mounted over the free end of the pipe which is provided with a protruding flat lug 15' and engaging into a corresponding slot 102 cut into the pipe. After the installation of the flange 16 and the retainer 15, the plastic liner is folded over the outside of the pipe end 100 including the retainer 15. The plate generally designated by reference numeral 17 which is also lined with plastic is then clamped over the end of the pipe by means of bolts 11. Again, the number of bolts 11 will vary according to the size of the pipe to be sealed. Preferably a retainer 15 is used at the location of each bolt in which case the retainer 15 will be in the nature of a spacer element. Upon tightning the bolts 11, the entire assembly is tightened to provide a pressure-tight seal.

FIGURE 6 illustrates another type of sleeve coupling which can be used in producing a connection similar to that of FIGURE 1. However, the sleeve coupling of FIGURE 6 will be used primarily only for smaller pipes. The sleeve 18 used in the sleeve coupling is plastic lined, two nuts 19 are used which are mounted on the outside of the sleeve 18. A sealing washer 20 is used with each nut 19 to provide a fluid-tight seal as in connection with FIGURE 4.

FIGURE 7 illustrates an axial cross section of a fluid-tight assembly for a pipeline assembly lined with a plastic liner in accordance with the present invention.

What is claimed is:
1. A method of lining a pipeline with a tubular plastic liner, comprising the steps of cutting off a pipeline section leaving a plurality of sections, pulling a tubular plastic lining through at least each remaining section, folding back the free end of each plastic liner over the outside of the corresponding pipeline section, and installing a pressure-tight joint at each over each folded back plastic liner at the end of the corresponding pipeline section by mounting a sealing washer over each folded-over plastic liner end, installing a clamp coupling over the sealing washer, and tightening said clamp coupling against said sealing washer to thereby provide a pressure-tight joint.

2. A method of lining a pipeline with a tubular plastic liner, comprising the steps of cutting off a pipeline section leaving a plurality of sections, pulling a tubular plastic lining through at least each remaining section, folding back the free end of each plastic liner over the outside of the corresponding pipeline section, and installing a pressure-tight joint at each over each folded back plastic liner at the end of the corresponding pipeline section by mounting a sealing washer over each folded-over plastic liner end, installing a clamp coupling over the sealing washer, installing a sleeve member between adjoining clamp couplings of adjacent pipeline sections, and tightening said clamp coupling against said sealing washer and against the clamp coupling on the other side of the sleeve member to thereby provide a pressure-tight joint.

3. A method of lining a pipeline with a tubular plastic liner, comprising the steps of cutting off a pipeline section leaving a plurality of sections, pulling a tubular plastic lining through at least each remaining section, folding back the free end of each plastic liner over the outside of the corresponding pipeline section, and installing a pressure-tight joint at each over each folded back plastic liner at the end of the corresponding pipeline section by mounting a sealing washer over each folded-over plastic liner end, installing a clamp coupling over the sealing washer installing a closure member at a dead end of a pipeline section, and tightening said clamp coupling against said sealing washer and against said closure member to thereby provide a pressure-tight joint.

4. A method for lining a pipeline with a tubular plastic liner, comprising the steps of cutting the pipeline, pulling the tubular plastic liner through a section of the cut pipeline and lining said pipeline section with said plastic liner, then folding back the free end portion of the plastic liner on the outside of said pipeline section, then mounting a sealing member over said folded-back free end portion, then installing a clamp coupling over the sealing member and tightening said clamp coupling against said sealing member to provide a pressure tight joint over the folded-back free end portion of said plastic liner at the end of said section of cut pipeline.

References Cited by the Examiner
UNITED STATES PATENTS

| | | | |
|---|---|---|---|
| 2,585,602 | 2/1952 | Turner | 285—55 |
| 2,679,410 | 5/1954 | Boughton | 277—237 |
| 3,003,339 | 10/1961 | Haushalter | 64—11 |
| 3,036,601 | 5/1962 | Fabian et al. | 138—89 |
| 3,068,561 | 12/1962 | Jones | 29—401 |
| 3,110,095 | 12/1963 | Peickii | 29—401 |
| 3,123,101 | 3/1964 | Blount et al. | 138—97 |
| 3,142,499 | 7/1964 | Lang | 285—55 |
| 3,207,184 | 9/1965 | Lambert | 138—89 |

JOHN F. CAMPBELL, *Primary Examiner.*

SAMUEL ROTHBERG, THOMAS H. EAGER,
*Examiners.*